March 3, 1931.    T. MADSEN    1,795,177
EXPANDING TOOL FOR PISTON RINGS
Filed Aug. 8, 1928
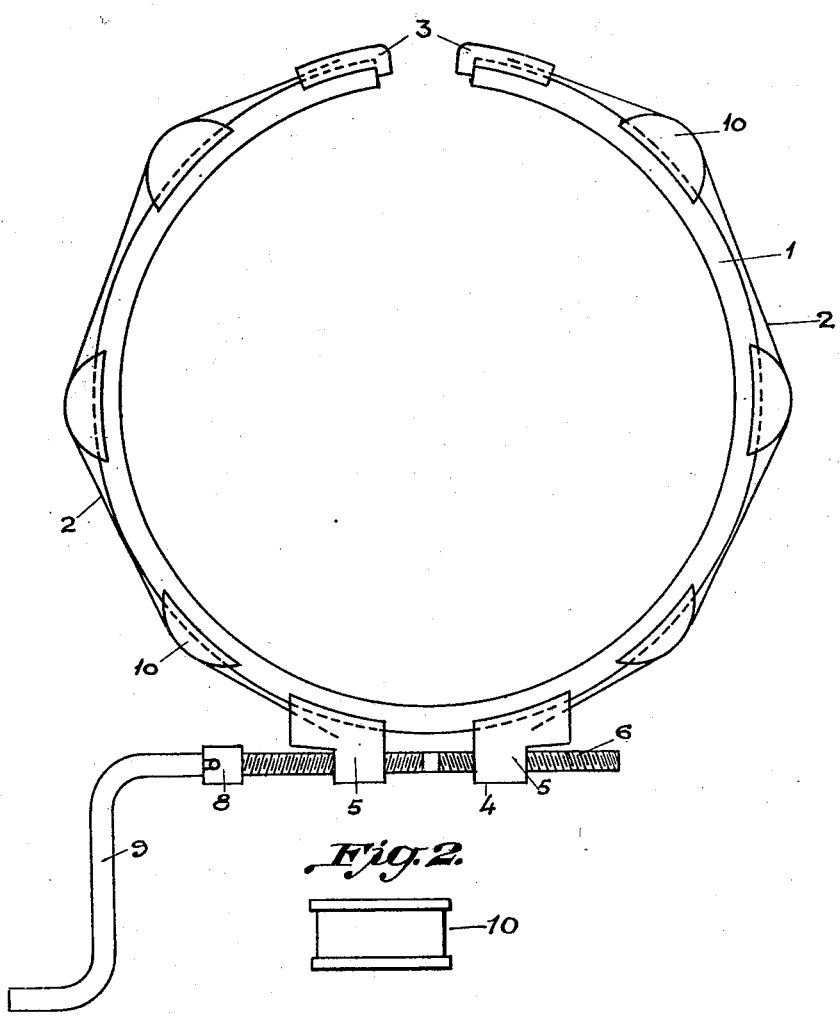

UNITED STATES PATENT OFFICE

TAGE MADSEN, OF GOTTENBORG, SWEDEN

EXPANDING TOOL FOR PISTON RINGS

Application filed August 8, 1928, Serial No. 298,373, and in Great Britain September 28, 1927.

This invention relates to tools for expanding split piston packing rings to such a degree that the rings can be threaded over the piston into the proper groove or removed from the same.

The most common manner, in which rings are mounted on the pistons, is to grasp the ends of the rings with the hands (one or more men employed) to move them apart, rest the middle part of the ring against the piston and by means of chisels, iron plate pieces, and the like as under-layers push the ring down over the piston by degrees. This method frequently causes damage to the ring which becomes easily deformed during the hard-handed and unequal treatment.

The piston ring expanding tool of the present invention is believed to have a wider field of usefulness and to be easier to apply and operate than the known devices. It consists of a band or the like applied around the piston packing ring and provided with hooks or the like at its ends to engage each end of the said ring and is characterized by the fact that the band is flexible and is provided with means for applying tension in the direction of its length to expand the piston ring.

For the purpose of stretching the band 2, any means or device which is equivalent of that herein shown and described, may be employed without departing from the spirit of the invention.

A band 2 is applied around the split piston packing ring 1 and provided with one hook 3 at each end for engagement with the two ends of the piston ring. The band is in the drawing divided in two parts, which are held together by means of a stretching or pulling device 4, in the illustrated case consisting of two lugs 5 and a right and left handed screw threaded bolt 6. Each lug 5 is connected to the end of a part of the band 2 and is provided with threads accommodating the threads of the bolt 6. The bolt 6 is provided with a fixed head 8, in which a crank handle 9 is inserted for turning the bolt and thus altering the distance between the two lugs 5. When the lugs 5 are moved towards each other the band 2 will become stretched thereby causing a pull on the ends of the piston ring to further open the gap between them. The turning of the crank 9 and the bolt 6 is continued until the diameter of the piston ring becomes somewhat larger than the diameter of the piston proper. Then the piston ring together with its attached expanding tool is lifted over the piston and moved down thereon in front of the piston groove, in which the ring is to be inserted. Now the tool is loosened by turning the crank 9 in the opposite direction whereby the ring goes into its groove and the tool loses its grip and falls down away from the ring.

Obviously the same tool can be used for removing a piston ring from its groove. This possibility is of great importance, especially in cases where the piston ring sticks to its groove on account of carbonized oil or the like. In such cases the tool can be as easily applied and conveniently used for the purpose of removing and replacing the old piston rings.

If the band 2 is closely applied to the outer surface of the piston ring the power necessary for expanding the ring will become quite large. The power will become less if the band is kept a distance away from the ring, for instance, by means of lugs 10. In the drawing six lugs are shown inserted between the band and the ring, not considering the two lugs 5, although they contribute to the same result. The number and the height of the lugs can be varied on the same ring and on different rings. The number can be made so large that the band practically consists only of lugs which are linked together. If the lugs are made of different height, for instance with declining height from the ends of the piston ring towards the middle of the ring the stress upon the ring on account of the expansion force can be distributed along the ring more evenly and the greatest stress which otherwise arises at the middle of the ring can be made less, and greater strain instead be laid upon the ends. On account of the smaller stress at the middle of the ring arising when this tool is used with proper height of the lugs, it will be possible to use piston rings with still larger radial width than hitherto.

This is a most important consequence in the application of this invention.

The lugs are preferably provided with means, so that they do not slide away from the ring during the operation. For this purpose the means mentioned consist of small flanges or radial ribs on the lugs extending downwards on both sides of the ring, as shown in the drawing. Furthermore the lugs are provided with eyes or grooves or the like to accommodate the band 2 and so arranged that the band can slide in said eyes and grooves and also be held therein in such way that the lugs do not fall away from the band when this is loosened from the piston ring.

The band can be manufactured from a steel belt, a chain, a wire or similar flexible material. The hooks 3 can have other forms than shown and should suit the ends of the ring whether these are square or inclined or stepped.

Figure 1 is a view in elevation of the expanding tool, embodying the invention, applied to a piston ring to be expanded.

Figure 2 is a plan view of one of several lugs constituting a part of the tool.

Figure 3 is a transverse sectional view through said lug.

The tool can be used not only upon common, single piston rings as illustrated but also upon other kinds of split piston rings, such as those composed of two split rings.

I claim:—

1. An expanding tool for split piston packing rings, consisting of a band adapted to be disposed around the piston packing ring and provided with hooks at its ends to engage each end of said ring, said band being flexible, means for applying tension to the band in the direction of its length, and lugs provided on the band at different points on the circumference of the ring.

2. An expanding tool for split piston packing rings, consisting of a band adapted to be disposed around the piston packing ring and provided with hooks at its ends to engage each end of said ring, said band being flexible, means for applying tension to the band in the direction of its length, the band being divided in two parts providing a free end on each part, a stretching device to which the free end of each part is connected, and lugs being provided on the band at different points to engage the circumference of the ring.

3. An expanding tool for split piston packing rings, consisting of a band adapted to be disposed around the piston packing ring and provided with hooks at its ends to engage each end of said ring, said band being flexible, means for applying tension to the band in the direction of its length, and lugs on the band at different points to engage the circumference of the ring, the lugs being of different height.

4. An expanding tool for split piston packing rings, consisting of a band adapted to be disposed around the piston packing ring and provided with hooks at its ends to engage each end of said ring, said band being flexible, means for applying tension to the band in the direction of its length, the band being divided in two parts, a stretching means to which the free ends of each part are connected, and lugs on the band at different points to engage the circumference of the ring, the lugs being of different height.

In witness whereof, I hereunto subscribe my name this 26th day of July, 1928.

TAGE MADSEN.